April 29, 1941.   H. A. BERGERT   2,239,873
APPARATUS FOR MOUNTING CRANKPINS AND THE LIKE
Filed Nov. 3, 1938
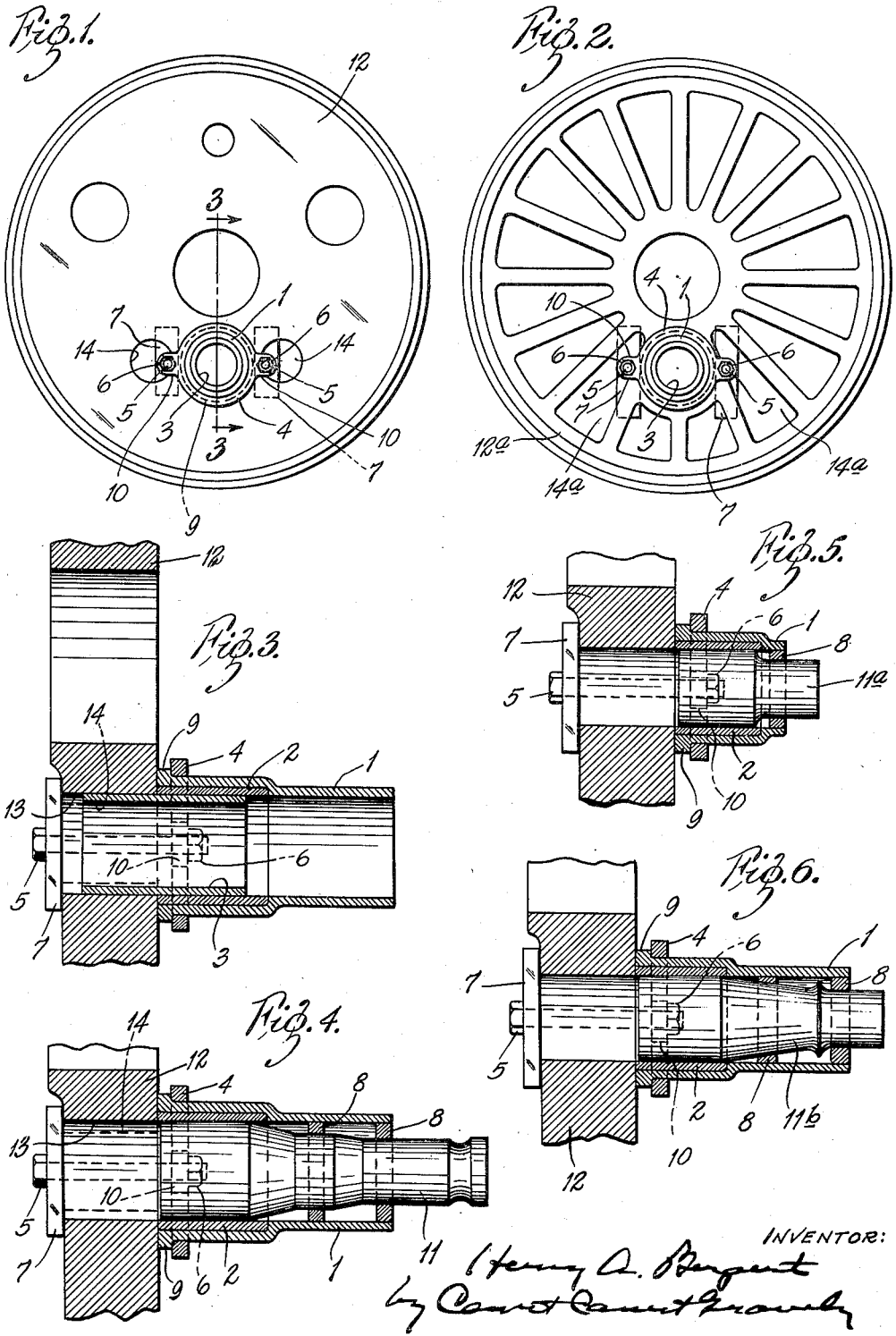
INVENTOR:
Henry A. Bergert
HIS ATTORNEYS.

Patented Apr. 29, 1941

2,239,873

UNITED STATES PATENT OFFICE 2,239,873

APPARATUS FOR MOUNTING CRANKPINS AND THE LIKE

Henry A. Bergert, Canton, Ohio, assignor to The Timken Roller Bearing Company, Canton, Ohio, a corporation of Ohio Application November 3, 1938, Serial No. 238,513

4 Claims. (Cl. 29—88.2)

This invention relates to an apparatus for mounting locomotive crankpins and the like and has for its principal objects to provide an apparatus for precisely centering and alining the pin with relation to the pin seat of the locomotive driving wheel and for rigidly holding it in correct position on the wheel until it is fully seated. Other objects are to adapt the apparatus for use with pins of different diameters and shapes and with wheels of different types and to provide for simplicity and cheapness of construction and ease of assembly and disassembly. The invention consists in the apparatus hereinafter described and claimed.

In the accompanying drawing, which forms part of this specification and wherein like symbols refer to like parts wherever they occur—

Fig. 1 is an exterior face view of a locomotive driving wheel of the disk type, showing my crankpin mounting apparatus mounted thereon, Fig. 2 is a view similar to Fig. 1 showing my crankpin mounting apparatus applied to a locomotive driving wheel of the spoke type, Fig. 3 is a fragmentary section on the line 3—3 in Fig. 1, showing the pilot sleeve for accurately centering the pin mounting apparatus with relation to the pin seat of the wheel, Fig. 4 is a view similar to Fig. 2, showing a main crankpin mounted in the apparatus in position to be pressed into the pin seat of the wheel; and Figs. 5 and 6 are views similar to Fig. 4, Fig. 5 showing a front crankpin mounting apparatus, and Fig. 6 showing a rear crankpin mounting apparatus.

My apparatus comprises a pilot sleeve 1, an adapter sleeve or bushing 2, a centering sleeve 3, an attaching ring 4, a pair of bolts 5, nuts 6 for the threaded ends of said bolts, a pair of bolt supports 7 and one or more supporting rings 8. The piloting sleeve 1 is enlarged or counterbored at one end to snugly receive the entire adapter sleeve or bushing 2; and said end of said piloting sleeve has an external collar or annular rib 9 formed thereon. The attaching ring 4 has a pair of diametrically opposed outstanding ears or lugs 10 with holes therein for the bolts 5; and the supports 7 are in the form of rectangular plates that also have holes therein for said bolts.

The operation of mounting a locomotive main crankpin 11 on a locomotive drive wheel 12 of the disk type is as follows: An adapter sleeve or bushing 2, having a bore of a diameter corresponding substantially to the diameter of the seat engaging end of the crankpin, is inserted in the counterbored seat provided therefor in the pilot sleeve 1 and a centering sleeve 3 having an outside diameter corresponding substantially to the diameter of the pin seat 12 of the wheel and the bore of said adapter sleeve is inserted part way into the latter. The exposed end of the centering sleeve 3 is then inserted into the pin seat 13 of the wheel with the exteriorly flanged end 9 of the pilot sleeve in abutting relation to the outer face of the wheel. The attaching ring 4 is then slipped over the pilot sleeve in abutting relation to the rib 9, the supporting plates 7 are then placed flatwise against the inner face of the wheel on opposite sides of the pin seat and the threaded ends of the bolts 5 are then passed through the holes in said plates, openings 14 in the wheel on opposite sides of said pin seat and the holes in the outstanding diametral ears 10 on said attaching ring and the nuts 6 applied to the bolts to clamp the pilot sleeve in proper position on the wheel. The centering sleeve 3 is then removed from the pilot sleeve 1 and the crankpin 11 inserted therein in accurate alinement with relation to the pin seat, after which supporting rings 8 of proper size are inserted in the pilot sleeve for supporting the reduced outer and intermediate portions of said pin. With the crankpin thus accurately centered and alined with the pin seat, pressure is applied axially to the outer end of the pin, with the result that the pin is precisely entered into said seat.

In mounting the apparatus on the spoke wheel 12a shown in Fig. 2, the bolts 5 are extended through the openings 14a formed by the spokes on opposite sides of the pin seat. The apparatus for mounting the front crankpin 11a shown in Fig. 5 or the rear crankpin 11b shown in Fig. 6 is similar to the apparatus for mounting the main crankpin 11, except for the difference in the length and diameter of some of the parts and the number and shape of the supporting rings 8.

The hereinbefore described apparatus has several advantages. It is adapted for use with pins of different sizes and shapes and for use with both disk and spoke wheels. The apparatus may be readily mounted on and dismounted from the wheel in precise alinement with the pin seat thereof and accurately centers, alines and supports the pin with relation to the pin seat during the entire operation of pressfitting the pin therein.

While the apparatus hereinbefore described is especially valuable in mounting crankpins on locomotive driving wheels, it is not limited to such use, but is adaptable for use in mounting other pin-like members that require accurate centering and alinement and whose weight renders them difficult to handle.

What I claim is:

1. Apparatus for use in mounting a solid or hollow pin in a bore, said apparatus comprising a pilot sleeve for said pin, a centering sleeve adapted to slidably fit said pilot sleeve and said bore to thereby position said pilot sleeve in accurate axial alinement with said bore, means for rigidly clamping said pilot sleeve endwise in such position to the member having said bore therein, whereby said centering sleeve may be withdrawn endwise from said bore and said pilot sleeve and said pin slid endwise through said pilot sleeve into said bore, the bore opposing end portion of said pilot sleeve being counterbored, and a detachable adapter sleeve seated in said counterbore and having an inside diameter corresponding substantially to the diameter of the bore engaging portion of said pin.

2. Apparatus for use in mounting in a bore the larger diameter of a crankpin of varying outside diameter, said apparatus comprising a pilot sleeve for said pin having a counterbored end portion, an adapter sleeve mounted in said counterbore and having an inner surface of a size to make a sliding fit for the larger bore engaging portion of said crankpin, a centering sleeve having a sliding fit in said adapter sleeve and said bore to thereby position said pilot sleeve in accurate axial alinement with said bore, means for rigidly clamping the adapter sleeve receiving end portion of said pilot sleeve endwise in such position to the member having said bore therein, whereby said centering sleeve may be withdrawn endwise from said bore and said adapter sleeve, and said crankpin slid endwise through said pilot sleeve into said bore, and a ring removably mounted in the other end of said pilot sleeve and snugly fitting the smaller outside diameter of said crankpin.

3. Apparatus for use in mounting a pin in a bore, said apparatus comprising a pilot sleeve for said pin, an adapter sleeve seated in said pilot sleeve and having an inside diameter corresponding substantially to the outside diameter of the bore engaging portion of said pin, a centering member adapted to fit within said adapter sleeve and said bore to thereby position said pilot sleeve in accurate axial alinement with said bore, and means for rigidly securing said pilot sleeve in such position to the member having said bore therein, whereby said centering member may be withdrawn endwise from said bore and said pilot sleeve, and said pin pressed endwise through said pilot sleeve into said bore, said means comprising an attaching ring sleeved on said pilot sleeve in abutting relation to an external shoulder thereon and fasteners operatively connecting said ring to the member having the pin receiving bore therein.

4. Apparatus for use in mounting a crankpin in the pin seat of a locomotive driving wheel having openings extending therethrough on opposite sides of said pin seat, said apparatus comprising a pilot sleeve for said crankpin, an adapter seated in said pilot sleeve and having an inside diameter corresponding substantially to the outside diameter of the pin seat engaging portion of said crank pin, a centering sleeve adapted to snugly fit within said adapter sleeve and said pin seat to thereby position said pilot sleeve in accurate axial alinement with said pin seat, and means for rigidly securing said pilot sleeve endwise in such position to the outer face of said driving wheel, whereby said centering sleeve may be withdrawn endwise from said pin seat and said adapter sleeve through said pilot sleeve, and said crankpin slid endwise through said pilot sleeve into said pin seat, said means comprising an attaching ring sleeved on said pilot sleeve in abutting relation to an external shoulder thereon, supporting members adapted to be placed against the inner face of said wheel opposite the openings therethrough and bolts adapted to extend through said openings and connect said supporting members to said attaching ring.

HENRY A. BERGERT.